US011248538B2

(12) United States Patent
Robertson, Jr. et al.

(10) Patent No.: US 11,248,538 B2
(45) Date of Patent: Feb. 15, 2022

(54) RADIALLY FASTENED FIXED-VARIABLE VANE SYSTEM

(71) Applicant: United Technologies Corporation, Hartford, CT (US)

(72) Inventors: Thomas J. Robertson, Jr., Glastonbury, CT (US); Nathan F. Champion, Enfield, CT (US); Steven J. Feigleson, Falmouth, ME (US)

(73) Assignee: Raytheon Technologies Corporation, Farmington, CT (US)

( * ) Notice: Subject to any disclaimer, the term of this patent is extended or adjusted under 35 U.S.C. 154(b) by 1193 days.

(21) Appl. No.: 14/857,886

(22) Filed: Sep. 18, 2015

(65) Prior Publication Data
US 2016/0108821 A1  Apr. 21, 2016

Related U.S. Application Data

(60) Provisional application No. 62/052,550, filed on Sep. 19, 2014.

(51) Int. Cl.
*F02C 9/54* (2006.01)
*F01D 25/24* (2006.01)
(Continued)

(52) U.S. Cl.
CPC ............... *F02C 9/54* (2013.01); *F01D 9/02* (2013.01); *F01D 9/041* (2013.01); *F01D 9/042* (2013.01);
(Continued)

(58) Field of Classification Search
CPC ...... F02C 9/20; F02C 9/54; F02C 9/22; F01D 17/14; F01D 9/041; F01D 17/16;
(Continued)

(56) References Cited

U.S. PATENT DOCUMENTS 2,692,676 A * 10/1954 Grover ............ A61B 17/06138
206/63.3
3,957,392 A   5/1976 Blackburn
(Continued)

FOREIGN PATENT DOCUMENTS

| EP | 2107219 | 10/2009 |
| GB | 2405184 | 2/2005 |
| WO | 0173268 | 10/2001 |

OTHER PUBLICATIONS

Extended European Search Report for Application No. 15185715.8 dated Mar. 18, 2016.

*Primary Examiner* — Thomas P Burke
(74) *Attorney, Agent, or Firm* — Carlson, Gaskey & Olds, P.C.

(57) ABSTRACT

A split case assembly for a gas turbine engine includes an outer diameter case defining a partial case structure for a gas turbine engine and multiple fixed-variable vanes attached to an inner diameter surface of the outer diameter case. Each of the fixed-variable vanes protrudes radially inward from the outer diameter case. Each of the fixed-variable vanes in the plurality of fixed-variable vanes is interfaced with one of a plurality of inner diameter boxes at a radially inward end of the fixed-variable vane, such that the inner diameter boxes define an inner diameter of a flow path and the outer diameter case defines an outer diameter flow path. Each of the fixed-variable vanes are interfaced with the one of the plurality of inner diameter boxes through at least one inner diameter shoe in a plurality of inner diameter shoes.

9 Claims, 6 Drawing Sheets

(51) Int. Cl.
  *F01D 9/02* (2006.01)
  *F01D 9/04* (2006.01)
  *F01D 25/26* (2006.01)
  *F01D 17/14* (2006.01)
  *F02C 3/04* (2006.01)
  *F02C 7/32* (2006.01)

(52) U.S. Cl.
  CPC ............ *F01D 9/047* (2013.01); *F01D 17/14* (2013.01); *F01D 25/24* (2013.01); *F01D 25/246* (2013.01); *F01D 25/26* (2013.01); *F01D 25/265* (2013.01); *F02C 3/04* (2013.01); *F02C 7/32* (2013.01); *F05D 2220/32* (2013.01); *F05D 2230/60* (2013.01); *F05D 2240/12* (2013.01); *F05D 2240/24* (2013.01); *F05D 2240/35* (2013.01)

(58) Field of Classification Search
  CPC ........ F01D 17/162; F01D 25/246; F01D 9/04; F01D 9/047; F05D 2250/90
  See application file for complete search history.

(56) References Cited

U.S. PATENT DOCUMENTS

| | | | |
|---|---|---|---|
| 4,274,805 A | 6/1981 | Holmes | |
| 4,679,400 A | 7/1987 | Kelm et al. | |
| 5,181,827 A | 1/1993 | Pellow et al. | |
| 5,211,537 A | 5/1993 | Langston et al. | |
| 5,796,199 A * | 8/1998 | Charbonnel | F01D 17/162 310/60 A |
| 7,238,003 B2 | 7/2007 | Synnott et al. | |
| 7,722,314 B2 | 5/2010 | Burdgick | |
| 7,901,178 B2 * | 3/2011 | Giaimo | F01D 11/001 415/160 |
| 2002/0197153 A1 | 12/2002 | Rogers | |
| 2005/0031238 A1 * | 2/2005 | Bruce | F01D 17/162 384/297 |
| 2005/0232763 A1 * | 10/2005 | Cormier | F01D 9/041 415/208.2 |
| 2006/0198982 A1 * | 9/2006 | Holland | F01D 9/042 428/66.6 |
| 2007/0020091 A1 * | 1/2007 | Giaimo | F01D 11/001 415/160 |
| 2007/0059161 A1 * | 3/2007 | Bouru | F01D 17/162 415/160 |
| 2008/0219832 A1 * | 9/2008 | Major | F01D 17/162 415/65 |
| 2009/0041580 A1 * | 2/2009 | Wichmann | F04D 29/322 415/209.3 |
| 2009/0087304 A1 * | 4/2009 | Lejars | F01D 5/3023 415/160 |
| 2009/0208338 A1 * | 8/2009 | Major | F01D 11/001 416/215 |
| 2011/0293406 A1 * | 12/2011 | Abadie | F01D 17/162 415/160 |
| 2013/0094942 A1 * | 4/2013 | MacKay | F01D 5/141 415/148 |
| 2013/0216361 A1 | 8/2013 | Propheter-Hinckley | |
| 2014/0140822 A1 * | 5/2014 | Capozzi | F01D 9/00 415/160 |
| 2015/0098813 A1 * | 4/2015 | Jarrett, Jr | F01D 9/042 415/209.3 |
| 2016/0115966 A1 * | 4/2016 | Wulf | F01D 11/001 415/148 |

* cited by examiner

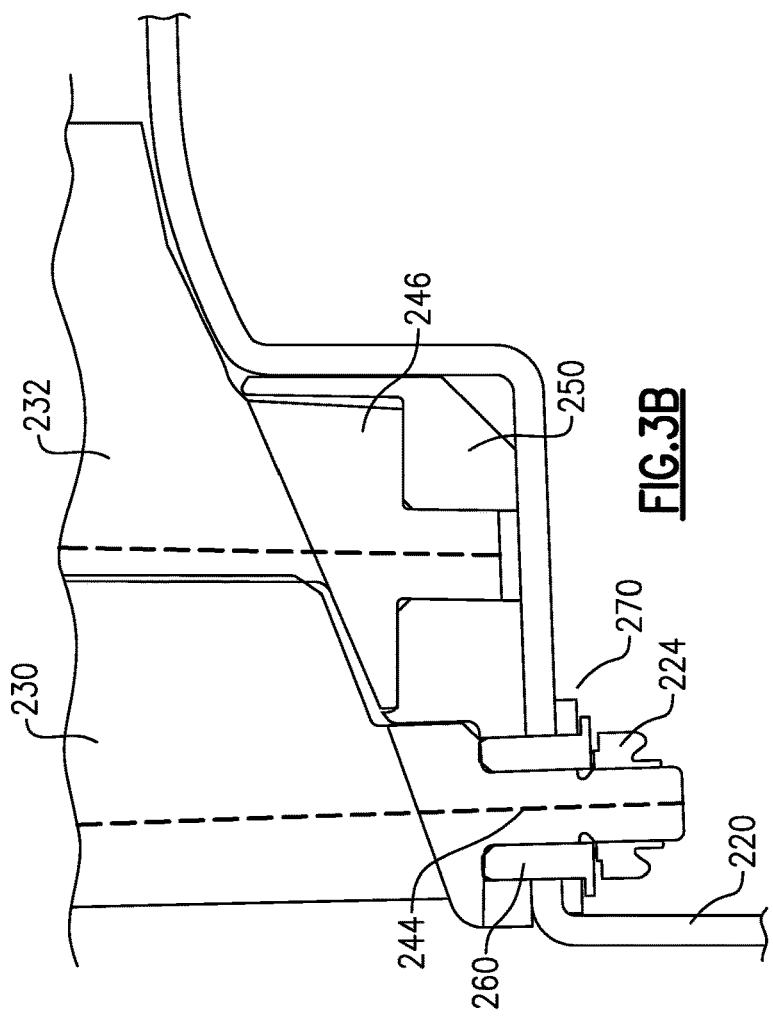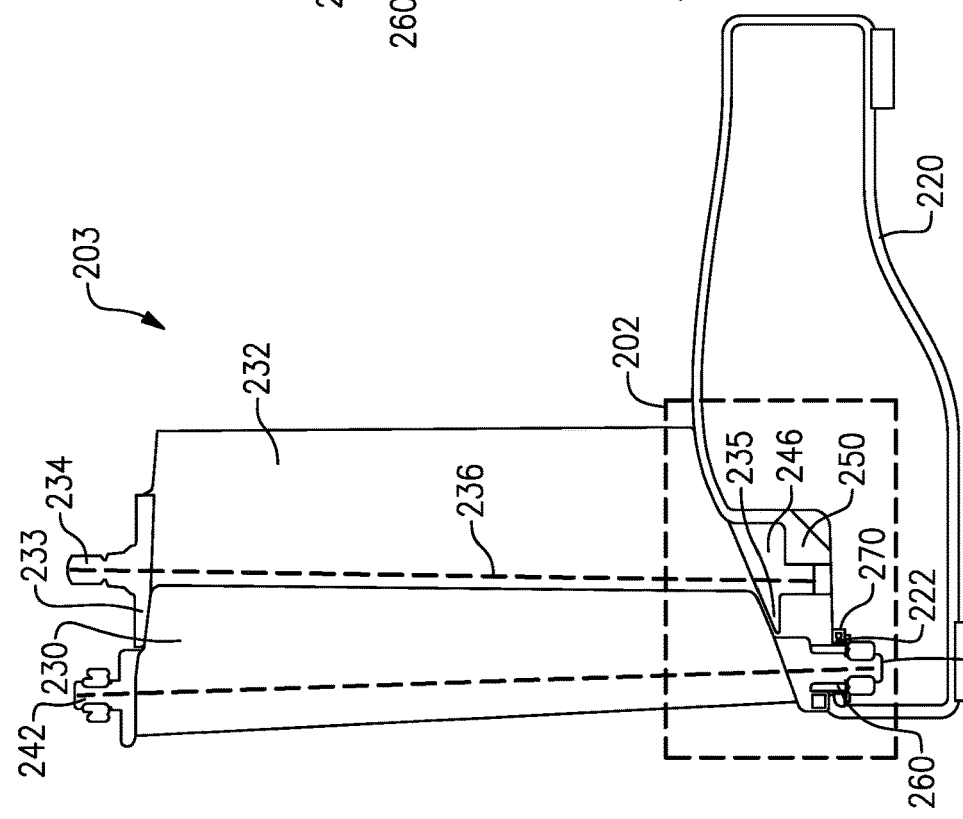

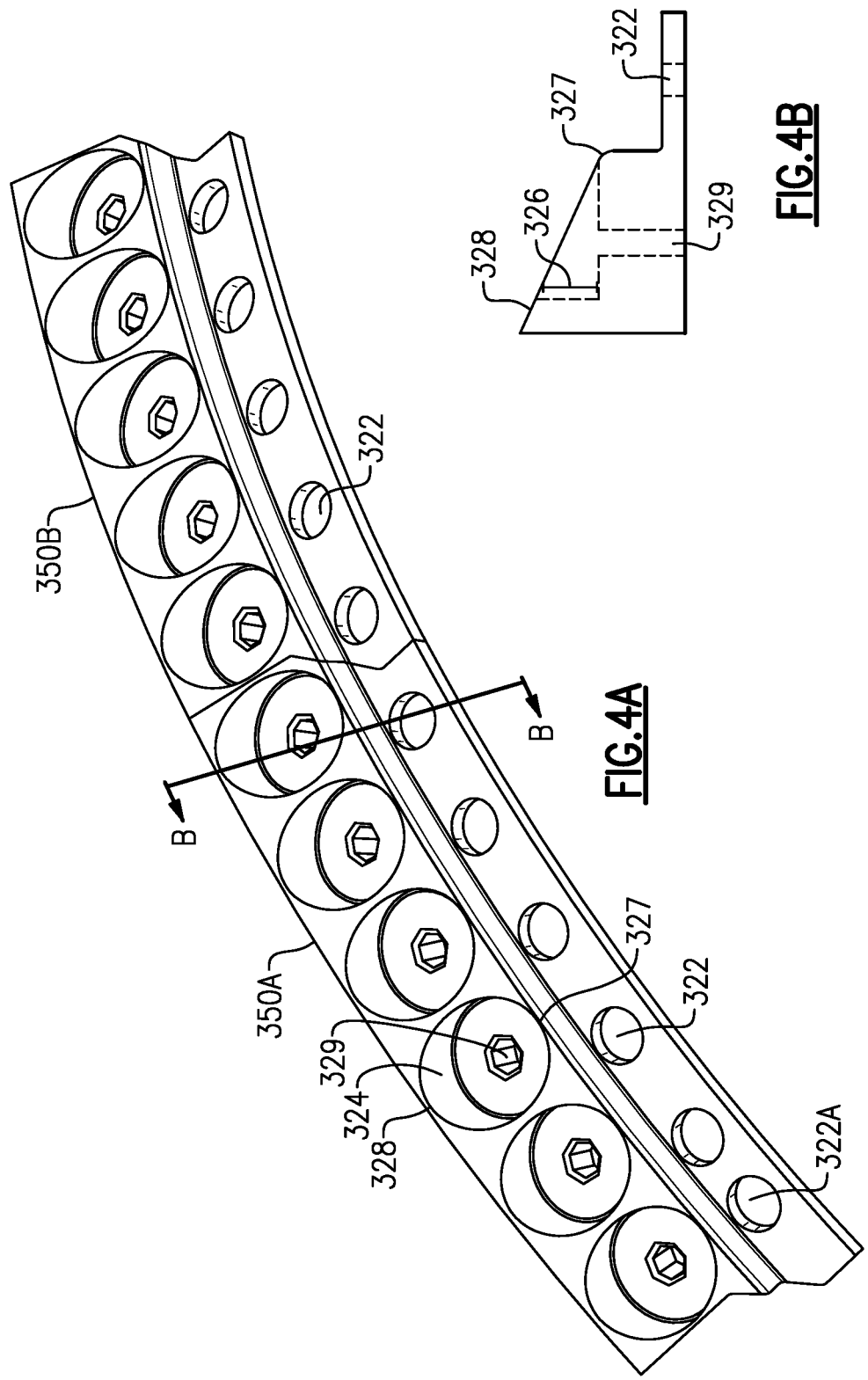

RADIALLY FASTENED FIXED-VARIABLE VANE SYSTEM

CROSS-REFERENCE TO RELATED APPLICATION

This application claims priority to U.S. Provisional Application No. 62/052,550 filed on Sep. 19, 2014.

STATEMENT REGARDING FEDERALLY SPONSORED RESEARCH OR DEVELOPMENT

This invention was made with government support under Contract No. FA8650-09-D-2923-0021, awarded by the United States Air Force. The Government therefore has certain rights in this invention.

TECHNICAL FIELD

The present disclosure relates generally to fixed-variable vane shrouds, and specifically to a radially fastened fixed-variable vane inner shroud.

BACKGROUND

Gas powered turbines typically include a compressor section, a combustor section, and a turbine section that operate in conjunction to drive rotation of a shaft. Each of the compressor section, the combustor section and the turbine section are fluidly connected by a flow path that allows a fluid, such as air, to flow axially through the gas powered turbine. In order to ensure that proper flow characteristics are maintained within the flow path, multiple static and variable vanes are positioned within the flow path and impart desirable flow characteristics on the fluid flowing through the flow path.

In some example engines, a combination of fixed and variable vanes, referred to as a fixed-variable vane system is incorporated. In typical split shroud manufacturing processes, the two stems resulting from the combination of the fixed-variable vane system cannot be installed simultaneously without significant modification to the fixed-variable vane fastening design.

SUMMARY OF THE INVENTION

In one exemplary embodiment, a gas turbine engine includes a compressor section, a combustor section fluidly connected to the compressor section by a flow path, a turbine section fluidly connected to the combustor section by the flow path, a fixed-variable vane system disposed within the flow path, wherein the fixed-variable vane system includes a plurality of fixed vanes disposed circumferentially about, and radially spanning, the flow path, a plurality of variable vanes, aft of the plurality of fixed vanes, wherein the plurality of variable vanes comprise at least a blade and a button, and wherein the plurality of variable vanes are disposed circumferentially about and radially spanning the flow path, a plurality of inner diameter boxes radially inward of the plurality of fixed vanes and the plurality of variable vanes, each inner diameter box in the plurality of inner diameter boxes including at least one inner diameter box clearance hole receiving a connection feature of at least one corresponding fixed vane, a plurality of inner diameter shoes disposed radially between the plurality of inner diameter boxes and the plurality of fixed vanes and the plurality of variable vanes, each of the inner diameter shoes including at least one inner diameter shoe clearance hole for receiving the connection feature, and at least one button hole for receiving the button of the variable vane.

In another exemplary embodiment of the above described gas turbine engine, each variable vane in the plurality of variable vanes is interfaced with one fixed vane in the plurality of fixed vanes.

In another exemplary embodiment of any of the above described gas turbine engines, the inner diameter box at least partially defines an inner diameter of the flow path.

In another exemplary embodiment of any of the above described gas turbine engines, the connection feature is a trunnion.

Another exemplary embodiment of any of the above gas turbine engines includes a bushing disposed in the inner diameter box clearance hole and the inner diameter shoe clearance hole, wherein the bushing is between a trunnion of a fixed vane and an outer diameter of the inner diameter box clearance hole and the inner diameter shoe clearance hole.

In another exemplary embodiment of any of the above described gas turbine engines, the button holes in the inner diameter shoe comprise a first hole having an upstream edge with a radial depth of zero and a downstream edge with a radial depth larger than zero, and wherein a nesting hole protrudes radially inward from the button hole and receives a connection feature of a variable vane.

In another exemplary embodiment of any of the above described gas turbine engines, a plurality of inner diameter shoes comprises circumferentially adjacent inner diameter shoes, and wherein each of the inner diameter shoes is disposed radially between at least one of the fixed vanes in the plurality of fixed vanes and one of the inner diameter boxes in the plurality of inner diameter boxes.

In another exemplary embodiment of any of the above described gas turbine engines, each inner diameter box in the plurality of inner diameter boxes is interfaced with at least one circumferentially adjacent inner diameter box in the plurality of inner diameter boxes.

An exemplary embodiment for a split case assembly for a gas turbine engine includes an outer diameter case defining a partial case structure for a gas turbine engine, a plurality of fixed-variable vanes attached to an inner diameter surface of the outer diameter case each of the fixed-variable vanes protruding radially inward from the outer diameter case, each of the fixed-variable vanes in the plurality of fixed-variable vanes being interfaced with one of a plurality of inner diameter boxes at a radially inward end of the fixed-variable vane, such that the inner diameter boxes define an inner diameter of a flow path and the outer diameter case defines an outer diameter flow path, and wherein each of the fixed-variable vanes are interfaced with the one of the plurality of inner diameter boxes through at least one inner diameter shoe in a plurality of inner diameter shoes.

In another exemplary embodiment for the split case assembly described above, each of the fixed-variable vanes comprises a fixed vane portion interfaced with a variable vane portion, and wherein an orientation of the fixed vane portion is constant relative to the flow path.

In another exemplary embodiment for any of the split case assemblies described above, each of the fixed-variable vanes includes a fixed vane stem, and wherein each of the fixed vane stems protrudes through a clearance hole in one of the plurality of inner diameter boxes and a clearance hole in one of the plurality of inner diameter shoes.

Another exemplary embodiment for any of the split case assemblies described above includes a bushing disposed between the fixed vane stem and an outer diameter of the clearance hole in one of the plurality of inner diameter boxes and the clearance hole in one of the plurality of inner diameter shoes.

In another exemplary embodiment for any of the split case assemblies described above, the plurality of inner diameter boxes includes a starter inner diameter box and at least one additional inner diameter box, and wherein the clearance holes in the starter inner diameter box are clocked, and wherein the clearance holes in the at least one additional inner diameter box are keyed.

In another exemplary embodiment for any of the split case assemblies described above, each inner diameter box in the plurality of inner diameter boxes is interfaced with an adjacent inner diameter box, each inner diameter box includes a radially aligned edge having a reduced circumference, and wherein the radially aligned edge is received in an adjacent inner diameter box.

In another exemplary embodiment for any of the split case assemblies described above, each of the inner diameter shoes comprises a plurality of clearance holes and a plurality of button holes, wherein the number of clearance holes and the number of button holes is the same.

In another exemplary embodiment for any of the split case assemblies described above, each of the button holes comprises an upstream edge having a first depth and a downstream edge having a second depth, and wherein the second depth is greater than the first depth.

In another exemplary embodiment for any of the split case assemblies described above, the first depth is zero.

An exemplary method for assembling any of the split engine cases described above includes radially installing a plurality of fixed-variable vanes in an outer diameter fan case, sliding at least one inner diameter shoe axially, relative to an axis defined by the outer diameter fan case, such that a connection feature of each fixed vane portion of the fixed-variable vanes is received in a clearance hole, and such that a button portion of each variable vane portion of the fixed-variable vanes is received in a button hole in the inner diameter shoe, interfacing the at least one inner diameter shoe with a plurality of inner diameter boxes, such that each of the inner diameter boxes receives at least one of the connection features in a corresponding clearance hole, such that the inner diameter boxes define an engine flow path inner diameter, and securing each of the inner diameter boxes in place using a fastener connected to the connection feature.

Another exemplary embodiment of the exemplary method for assembling any of the split engine cases described above includes interfacing each inner diameter box with at least one adjacent inner diameter box by shifting one of the inner diameter boxes circumferentially after the connection feature is received in the inner diameter box clearance holes.

In another exemplary embodiment of the exemplary method for assembling any of the split engine cases, interfacing the at least one inner diameter shoe with the plurality of inner diameter boxes comprises ensuring that each joint between one of the inner diameter boxes and an adjacent of the inner diameter boxes is overlapped by at least one of the inner diameter shoes.

These and other features of the present invention can be best understood from the following specification and drawings, the following of which is a brief description.

BRIEF DESCRIPTION OF THE DRAWINGS

FIG. 3A schematically illustrates a cross sectional view of a fixed-variable vane segment.

FIG. 3B schematically illustrates a zoomed in partial view of the cross sectional view of FIG. 3A.

FIG. 4A schematically illustrates an isometric view of an inner diameter shoe for a fixed variable vane segment.

FIG. 4B schematically illustrates cross sectional view of the inner diameter shoe of FIG. 4A.

DETAILED DESCRIPTION OF AN EMBODIMENT

Figure 1:
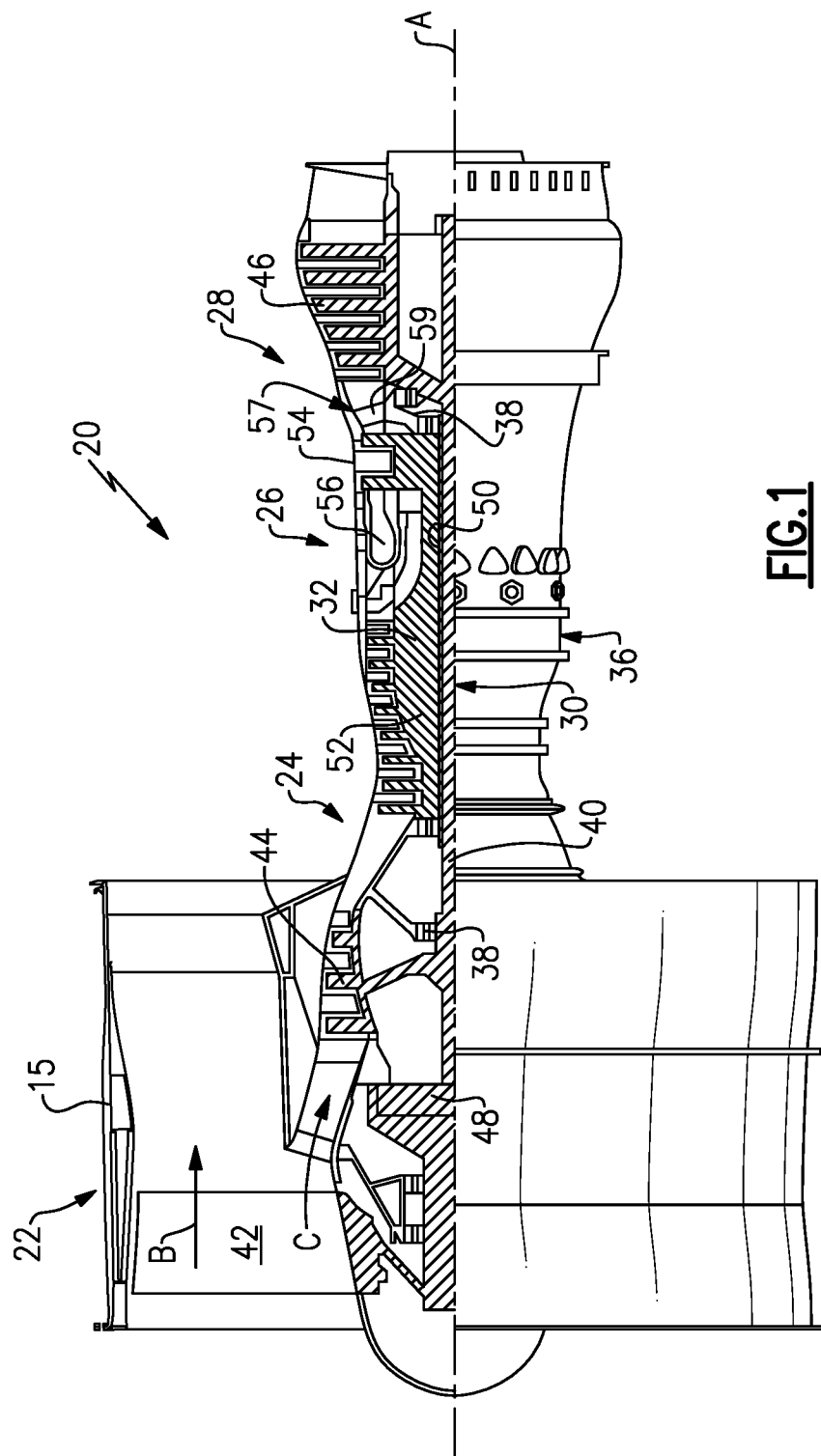
FIG. 1 schematically illustrates an exemplary gas turbine engine.

FIG. 1 schematically illustrates gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including, but not limited to, three-spool architectures, direct drive turbines, Adaptive Engines, and third-stream adaptive engines.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, and the turbine section 28.

During operation of the gas turbine engine 20, flow characteristics of the airflow through the airflow path C are affected by the direction of the airflow path, and components passing into and through the airflow path. In order to optimize the flow characteristics of the airflow path C, multiple vanes are incorporated within the gas turbine engine 20. The vanes radially span the airflow path C, and are static relative to the engine case. In some examples, such as in an adaptive engine or a third-stream adaptive engine, different operational parameters of the gas turbine engine 20 can require different angles of the vanes, relative to fluid flow through the airflow path C. In order to compensate for this feature, some example gas turbine engine designs incorporate a fixed-variable vane arrangement.

In a fixed-variable vane arrangement, the vanes are packaged as a pair, with each pair including a fixed vane and a variable vane. Each variable vane is immediately downstream of the paired fixed vane. This arrangement allows for the fixed vane portion of the fixed-variable vane to impart certain flow characteristics on the airflow path C at all times, and for the variable vane portion of the fixed-variable vane to be adjustable, depending on the current operating parameters of the engine.

Figure 2:
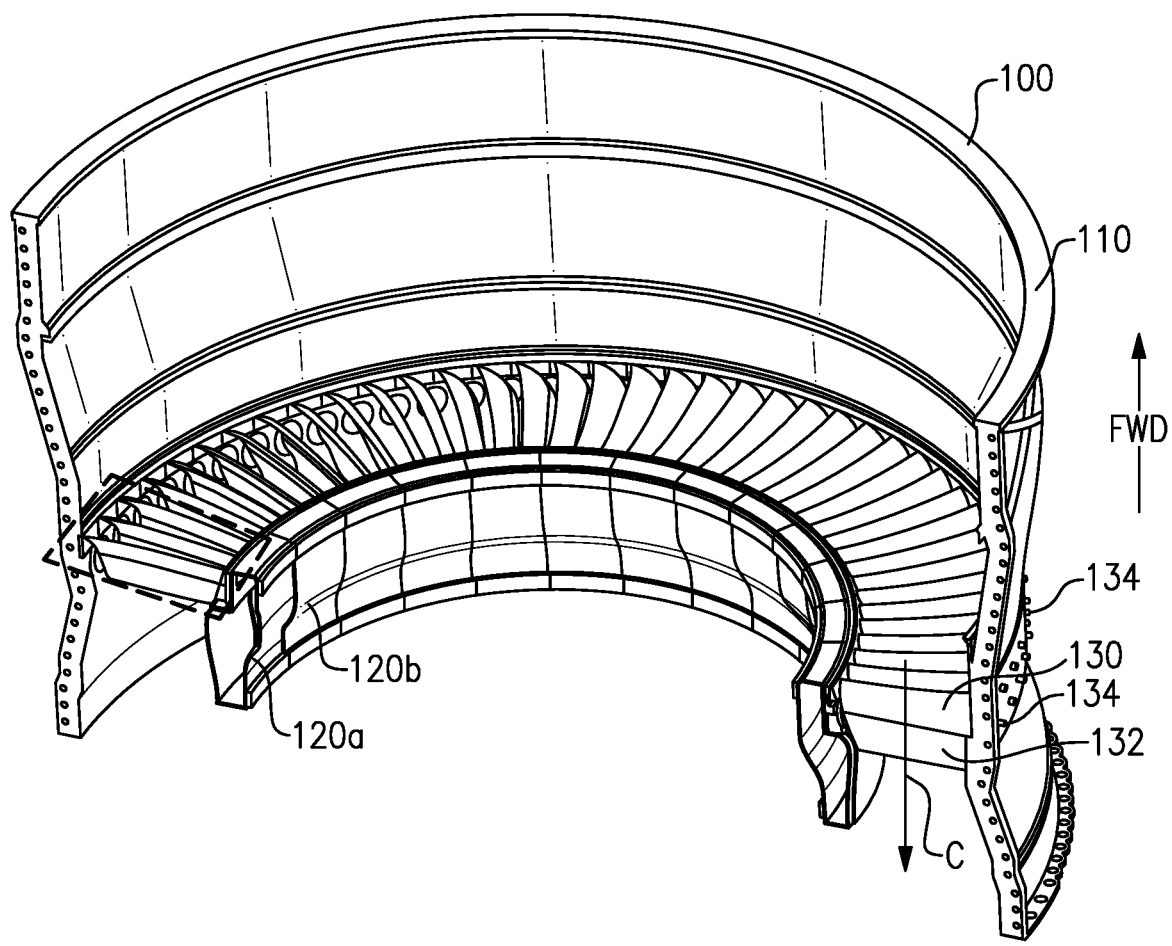
FIG. 2 schematically illustrates a split case for a gas turbine engine.

FIG. 2 schematically illustrates a split case 100 for a gas turbine engine including multiple fixed vanes 130 and variable vanes 132 passing through the airflow path C. In the illustrated example, the split case 100 includes an outer diameter case 110 and multiple inner diameter boxes 120a, 120b. The airflow path C of the gas turbine engine 20 is defined between the inner diameter boxes 120a, 120b and the outer diameter case 110. Radially spanning the airflow path C are multiple fixed vanes 130, and multiple variable vanes 132. Each grouping of fixed vanes 130 and variable vanes 132 is referred to as a fixed-variable vane segment, and can include multiple fixed vanes 130 and multiple variable vanes 132. The outer diameter case 110 is a split case, and is joined with a second corresponding split case to form a complete circumferential ring in a fully assembled engine. In alternate examples, the full engine case can be constructed of three or more split cases 100 instead of two split cases 100. The split cases 100 are joined during assembly of the gas turbine engine 20. The inner diameter boxes 120a, 120b each mount to at least one fixed-variable vane segment, and provide a radial fastening of the vanes 130, 132. Further components of the split case 100 can be included, but are omitted in the illustrated example of FIG. 2 for illustrative effect.

Each of the variable vanes 132 includes an articulation member 134 extending radially outward from the variable vane 132. The articulation member 134 can be connected to an articulation means (not pictured), such as an actuator, and allows the variable vane 132 to be rotated during operation of the gas turbine engine 20.

With continued reference to FIG. 2, and with like numerals indicating like elements, FIG. 3A schematically illustrates a cross sectional side view of a fixed-variable vane segment 203. Similarly, FIG. 3B schematically illustrates a zoomed in view of a radially inward fastening portion 202 of the cross section of FIG. 3A. A fixed vane 230 extends radially outward from an inner diameter box 220. The fixed vane 230 includes a connection feature 242 on a radially outward end of the fixed vane 230. The connection feature 242 connects to the outer diameter case 110 (illustrated in FIG. 2), and maintains the fixed vane 230 in position. On a radially inward end of the fixed vane 230, a second connection feature 244, such as a trunnion, protrudes through a clearance hole 222 in an inner diameter box 220. The protruding connection feature 242 of FIG. 2 is alternately referred to as a stem.

Immediately downstream of the fixed vane 230, relative to fluid flow, is a variable vane 232. An articulation member 234 extends radially outward from the variable vane 232 on a radially outward end of the variable vane 232. As with the protruding connection feature 242 of the fixed vane 230, the articulation member 234 is alternately referred to as a stem. A variable vane button 246 extends radially inward from the variable vane 232 and interfaces with a button hole in an inner diameter shoe 250. The inner diameter shoe 250 is illustrated in greater detail in FIG. 4. The variable vane button 246 maintains the variable vane 232 in position along a radial line 236, while at the same time allowing the variable vane 232 to be rotated freely about the radial line 236.

The variable vane 232 includes a radially outward extension 233 and a radially inward extension 235. The extensions 233, 235 extend axially away from the variable vane 232 at the radially outward end of the variable vane 232 and the radially inward end of the variable vane 232, respectively. The fixed vane 230 fits partially between the extensions 233, 235.

Disposed within the clearance hole 222, and between the clearance hole 222 and the second connection feature 244, is a bushing 260. The clearance hole 222 is sized significantly larger than the second connection feature 244, for assembly purposes, and the bushing 260 fills the gap between the clearance hole 222 and the second connection feature 244, resulting in a tight fit connection. The second connection feature 244 protrudes radially beyond the bushing, relative to a radius of the gas turbine engine 20, and a fastener 224 fastens the second connection feature 244 in place. In some examples, an optional backer plate 270 is included, and abuts an inside surface of the inner diameter box 250. The backer plate 270 provides further structural support to the overall assembly, and spans a joint between the illustrated fixed-variable vane segment 203 and at least one circumferentially adjacent fixed-variable vane segment 203.

With continued reference to FIGS. 3A and 3B, FIG. 4A isometrically illustrates a first example inner diameter shoe 350A and a second example inner diameter shoe 350B. FIG. 4B illustrates a cross sectional view, along view line B-B, of the isometric view of FIG. 4A. Each of the inner diameter shoes 350A and 350B are functionally identical, with the exception of the number of fixed-variable vane segments 203 (illustrated in FIG. 3A) that can be supported by a single shoe 350A, 350B. The first inner diameter shoe 350A is capable of supporting six fixed-variable vane segments, and the second inner diameter shoe 350B is capable of supporting five fixed-variable vane segments 203. In alternative examples, an inner diameter shoes 350A, 350B can accommodate any number of fixed-variable vane segments 203, and the inner diameter shoes 350A, 350B can be intermixed, depending on the specific vane counts of the engine in which they are incorporated.

Each of the inner diameter shoes 350A, 350B includes multiple clearance holes 322 for receiving second connection features 244 (illustrated in FIG. 3A) of corresponding fixed vanes 230. The clearance holes 322 are spaced evenly circumferentially, with the exception of a first clearance hole 322A. The first clearance hole 322A is positioned at the fan case split edge, and indicates where the first installed fixed vane 230 is positioned. By spacing the first clearance hole 322A differently than the remainder of the clearance holes 322, proper installation is ensured because only the correct inner diameter box 250 can be connected at the first clearance hole 322A. This alternate spacing is also referred to as "clocking".

Each inner diameter shoe 350A, 350B further includes multiple button holes 324 spaced circumferentially along the inner diameter shoe 350A, 350B. Each of the button holes 324 has a depth 326 that varies along the direction of fluid flow through the airflow path C. The upstream edge 327 of each button hole 324 has a zero depth, while the downstream edge 328 of each button hole 324 is the maximum depth 326. In other words, the upstream edge 327 has a first depth and the downstream edge 328 has a second depth, and the second depth is greater than said first depth. The varied depth of the button holes shoe 350A, 350B allows the button holes 324 to be axially slid into position (relative to the engine axis) after the fixed-variable vane segment 203 has been radially connected to the outer diameter case 110. The button holes 350A, 350B each further include a nesting hole 329 for receiving a protruding portion of the corresponding button 246. The nesting hole 329 maintains the variable vane 232 in position radially, relative to an axis defined by the engine 20.

Figure 5:
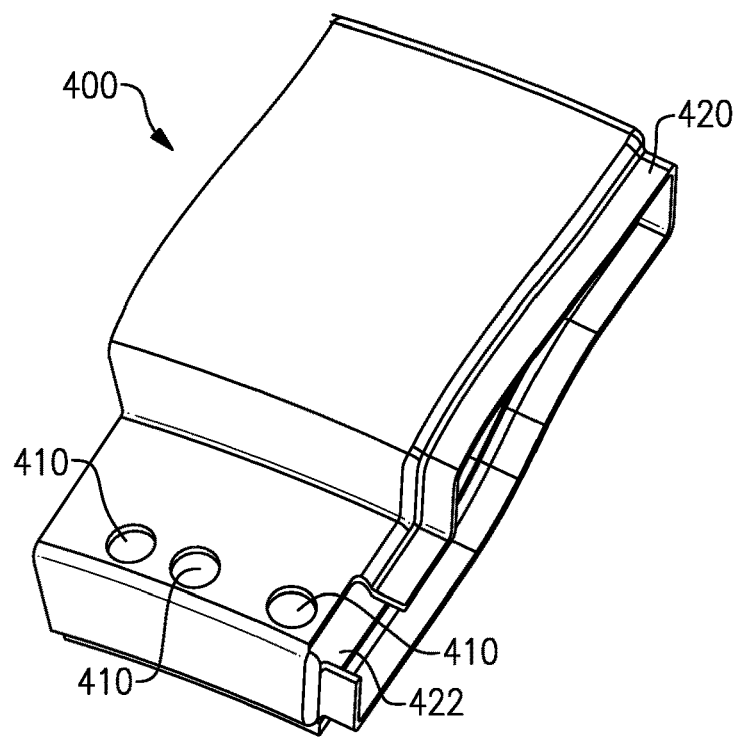
FIG. 5 schematically illustrates an isometric view of an example starter inner diameter box for the fixed-variable vane segment.
Figure 6:
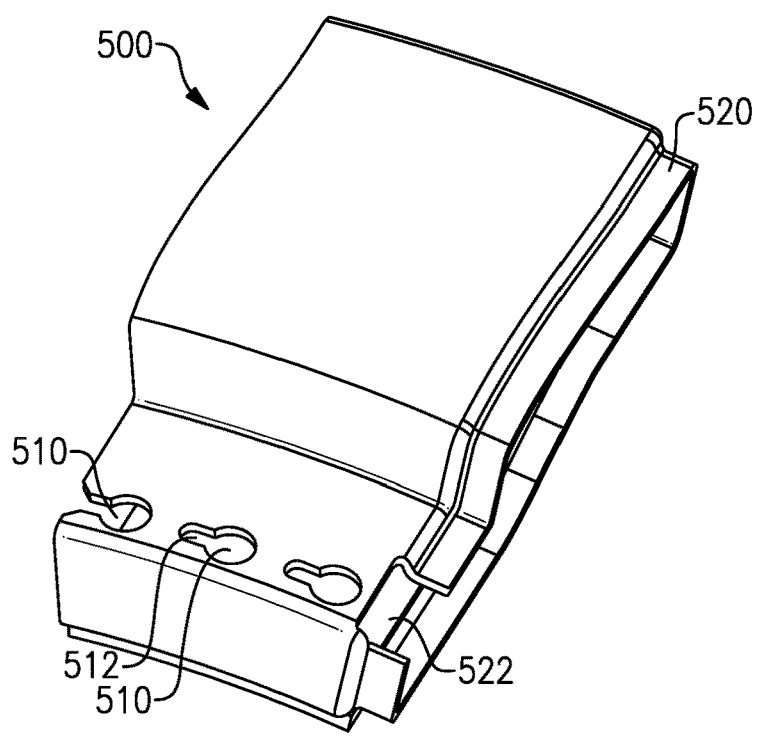
FIG. 6 schematically illustrates an isometric view of an example standard inner diameter box for the fixed-variable vane segment.
Figure 7:
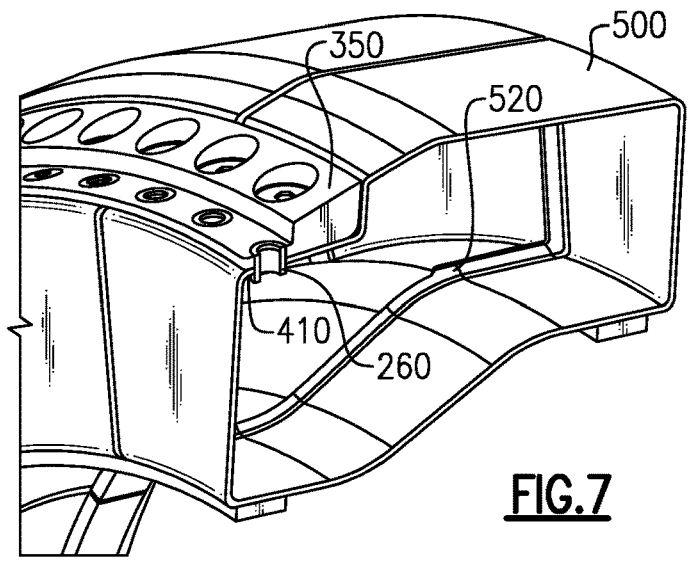
FIG. 7 schematically illustrates an isometric view of an inner diameter box and a shoe in a partially assembled fixed-variable vane segment.

With continued reference to FIGS. 2-4, FIG. 5 schematically illustrates an inner diameter box 400 and FIG. 6 schematically illustrates an inner diameter box 500. The inner diameter box 400 of FIG. 5 is a starter box, and corresponds to the inner diameter box 120a of FIG. 2. The starter inner diameter box 400 includes clearance holes 410 for receiving the second connection feature 244 of a fixed vane 230. The clearance holes 410 are clocked (non-uniformly spaced) in the same manner as the clearance holes 322 on the inner diameter shoe 350A. The clocking ensures that only the initial fixed-variable vane pack 203 can be received in the inner diameter box 400. One edge 420 of the inner diameter box has a reduced circumference, in order to allow the edge 420 to be received inside an adjacent inner diameter box 500.

After the initial starter inner diameter box 400, each of the remaining inner diameter boxes 500 in the case assembly is of the design illustrated in FIG. 6. The inner diameter box 500 of FIG. 6, includes evenly spaced, keyed clearance holes 410. The keyed feature allows the second connection feature 244 of the fixed vane 230 to be received in a keyed area 512 of the clearance hole 510 prior to interfacing the inner diameter box 500 with the adjacent inner diameter box 500. Once the second connection features 244 are received in the keyed clearance holes 510, the inner diameter box 500 is shifted circumferentially, relative to a circumference of the gas turbine engine, and interfaced with the reduced circumference edge 420 of the adjacent inner diameter box 500. The keyed nature of the inner diameter box 500 facilitates this installation order and technique, by allowing the received second connection feature 244 to shift circumferentially.

In some examples, the first inner diameter box 400 (illustrated in FIG. 5) and the remainder of the inner diameter boxes 500 (illustrated in FIG. 6) are constructed of different materials.

Each of the inner diameter boxes 400, 500 includes a slot 422, 522 in the reduced circumference edge 420, 520 of the inner diameter box 400, 500. The slot 422, 522 provides room for the second connection feature of the fixed vane connected to the adjacent inner diameter box 500, and further facilitates the interfacing between each inner diameter box 400, 500 and its adjacent box 400, 500.

With continued reference to FIGS. 2-6, FIG. 7 illustrates how the inner diameter boxes 500, the inner diameter shoes 350 and the bushings 410 interface with each other without illustrating the remaining components. As can be seen, each inner diameter shoe 350 overlaps at least one joint between adjacent inner diameter boxes 500. A bushing 260 is inserted in the clearance holes 322, 410 in the inner diameter shoe 350 and the inner diameter box 500. The reduced circumference edge 520 is inserted into, and interfaces with, the adjacent inner diameter box 500. All of the components include a general curvature, such that enough interfaced inner diameter shoes 350 and inner diameter boxes 500 forms a complete ring. In a practical embodiment, such as with a split case engine, the assembly includes only a partial ring. The partial ring is then connected to another partial ring when the split engine cases are joined into a single engine case, to form a full ring.

Figure 8:
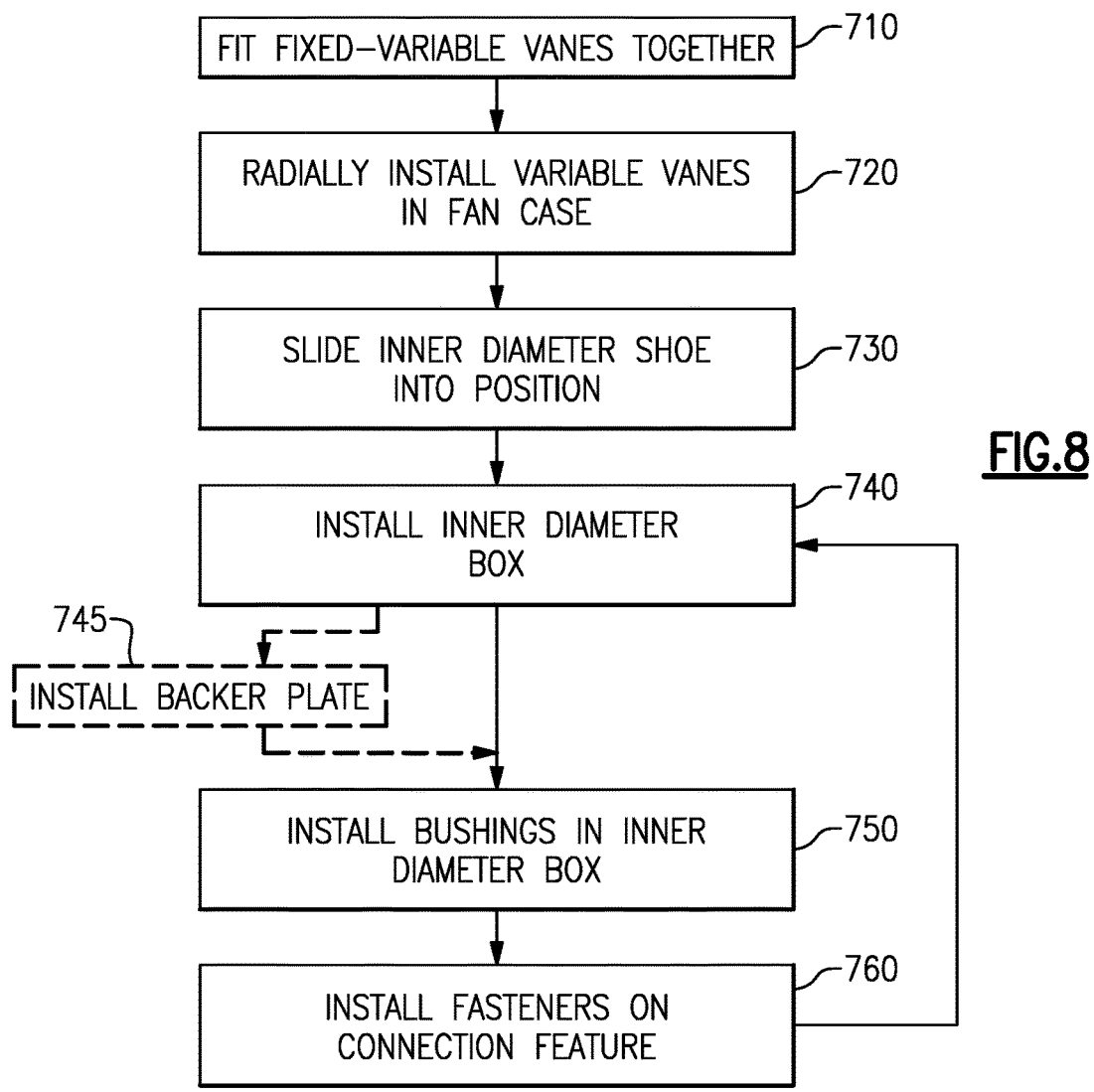
FIG. 8 is a flowchart illustrating a process for assembling a fixed-variable vane structure in a split engine case.

With continued reference to all of the preceding Figures, FIG. 8 illustrates an example assembly procedure for constructing the assembled component illustrated in FIG. 3A using the above described individual components.

Initially, each of the fixed vanes 230 is fit into a corresponding variable vane 232 in a "Fit Fixed-Variable Vanes Together" step 710. In the illustrated example, the fixed vane 230 is radially shorter than the variable vane 232, and the fixed vane 230 fits partially between the axial extensions of the variable vane 232. While illustrated in FIG. 3A as radially outward and radially inward variable vane extensions 233, 235, one of skill in the art, having the benefit of this disclosure will understand that the features for interfacing the fixed vane 230 and the variable vane 232 can be altered according to the needs of a specific engine.

Once each variable vane 232 has been fit together with a fixed vane 230, the resultant fixed-variable vane segment 203 is radially installed into the outer diameter fan case 110, illustrated in FIG. 2, in a "Radially Install Variable Vanes In Fan Case" step 720. Each of the fixed-variable vane segments 203 are installed individually, until all the fixed-variable vane segments 203 for the case section are installed. At this stage of installation, the fixed-variable vane segments 203 are loosely installed, and can be rotated and manipulated relative to the outer diameter fan case 110.

Once the fixed-variable vane segments 203 are installed, the inner diameter shoes 250 are positioned in a "Slide Inner Diameter Shoe Into Position" step 730. First, the second connection feature 244 of the fixed vane is positioned in the clearance hole 322 in the inner diameter shoe 250. Then, the shoe 250 is slid axially into position, with the variable vane button 246 sliding into the button hole 324 in the shoe 250. The button hole 324 receives the variable vane button 246 without restricting rotation of the variable vane 232.

Once all of the inner diameter shoes 250 have slid into position, the first inner diameter box 120a is installed at a first edge of the split case 100 in an "Install Inner Diameter Box" step 740. Because of the clocked nature of the clearance holes 410, the first inner diameter box 120*a* can only be installed in a single position, and the remainder of the boxes are positioned and installed relative to the first inner diameter box 120*a*. To install the first inner diameter box 120*a*, the second connection features 244 of the fixed vanes 230 are passed through the clearance holes 222 in the inner diameter box 120*a*. The inner diameter box 120*a* is then temporarily maintained in position until a later step in the assembly.

In example engines including an optional backer plate 270, once the inner diameter box 120*a* is in place, the optional backer plate 270 is installed in an "Install Backer Plate" step 745. The optional backer plate 270 provides additional structural support to the inner diameter structure created by the adjoining inner diameter boxes 120*a*, 120*b*, at the cost of increased weight.

Once the inner diameter box 120*a*, is in place, bushings 260 are positioned in each of the clearance holes 322, 410, between the outer diameter of the clearance holes 322, 410 and the second connection feature 244 passing through the clearance holes, in an "Install Bushing In Inner Diameter Box" step 750. The bushings 260 reduce the effective size of the clearance holes 322 and create a tight fit between the second connection feature 244 of the fixed vane 230 and the assembly including the inner diameter shoe 250 and the inner diameter box 120*a*.

Once the bushings are properly positioned, the inner diameter box 120*a* is fastened in position by installing fasteners on the second connection feature 244 in an "Install Fasteners On Connection Feature" step 760. The fasteners can be nuts, bolts, or any other suitable fastener type. Once the first inner diameter box 120*a* has been installed using the above steps 740, 750, 760, the process returns to step 740.

In the second iteration of, and all further iterations of, the "Install Inner Diameter Box" step 740, the second connection feature 244 of the fixed vane 230 is initially positioned in the keyed portion 512 of the clearance holes 510. Once in position, the inner diameter box 120*b* is slid circumferentially, relative to the circumference of the engine 20, such that it interfaces with the reduced circumference edge 420 of the adjacent inner diameter box 400, 500. Sliding the inner diameter box 120*a* circumferentially shifts the second connection feature 244 of the fixed vane 230 into the larger diameter portion of the clearance hole 222, and allows the remaining assembly steps to be completed.

The modified "Install Inner Diameter Box" step 740, and steps 750, and 760 are repeated until the completed engine case is assembled. In engines utilizing the optional backer plate, the "Install Backer Plate" step 745 is also repeated.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A split case assembly for a gas turbine engine comprising:
   an outer diameter case defining a partial case structure for a gas turbine engine;
   a plurality of fixed-variable vanes attached to an inner diameter surface of said outer diameter case each of said fixed-variable vanes protruding radially inward from said outer diameter case;
   each fixed-variable vane in said plurality of fixed-variable vanes being interfaced with one of a plurality of inner diameter boxes at a radially inward end of the fixed-variable vane, such that said inner diameter boxes define an inner diameter of a flow path and the outer diameter case defines an outer diameter of the flow path; and
   each fixed-variable vane in the plurality of fixed-variable vanes is interfaced with said one of said inner diameter boxes in said plurality of inner diameter boxes through at least one inner diameter shoe in a plurality of inner diameter shoes, wherein said plurality of inner diameter shoes are disposed radially between the plurality of inner diameter boxes and the plurality of fixed-variable vanes;
   each of said inner diameter shoes comprises a plurality of clearance holes and a plurality of button holes, each button hole in the plurality of button holes comprising a depth that varies along a direction of fluid flow through a primary flowpath of the gas turbine engine, the depth being the radial height of the button hole relative to a radius of the gas turbine engine, and each button hole in said plurality of button holes comprises an upstream edge having a first depth and a downstream edge having a second depth, the first depth being zero; and
   wherein the first depth is a depth parallel to a wall defining the button hole.

2. The split case assembly of claim 1, wherein each fixed-variable vane in the plurality of fixed-variable vanes comprises a fixed vane portion interfaced with a variable vane portion, and wherein an orientation of said fixed vane portion is constant relative to said flow path.

3. The split case assembly of claim 1, wherein each fixed-variable vane in the plurality of fixed-variable vanes includes a fixed vane stem, and wherein each of said fixed vane stems protrudes through a clearance hole in one of said plurality of inner diameter boxes and a clearance hole in one of said plurality of inner diameter shoes.

4. The split case assembly of claim 3, further comprising a bushing disposed between said fixed vane stem and an outer diameter of the clearance hole in one of said plurality of inner diameter boxes and the clearance hole in one of said plurality of inner diameter shoes.

5. The split case assembly of claim 4, wherein said plurality of inner diameter boxes includes a starter inner diameter box and at least one additional inner diameter box, and wherein said clearance holes in said starter inner diameter box are clocked, and wherein said clearance holes in said at least one additional inner diameter box are keyed.

6. The split case of claim 4, wherein each inner diameter box in said plurality of inner diameter boxes is interfaced with an adjacent inner diameter box, each inner diameter box includes a radially aligned edge having a reduced circumference, and wherein the radially aligned edge is received in an adjacent inner diameter box.

7. The split case of claim 1, wherein a number of clearance holes in the plurality of clearance holes is identical to a number of button holes in the plurality of button holes.

8. The split case of claim 1, wherein each fixed-variable vane in the plurality of fixed-variable vanes is interfaced with said one of said inner diameter boxes in said plurality of inner diameter boxes via a connection feature protruding radially through at least one inner diameter shoe in the plurality of inner diameter shoes.

9. The split case of claim 1, wherein each of the button holes in the plurality of button holes further includes a nesting hole.

\* \* \* \* \*